3,005,789
DRIER COMPOSITION

Albert Bloom, Summit, N.J., assignor to General Aniline & Film Corporation, New York, N.Y., a corporation of Delaware
No Drawing. Filed Oct. 11, 1955, Ser. No. 539,922
32 Claims. (Cl. 260—22)

This invention relates to new and useful drier compositions and to other compositions such as paints, varnishes, enamels, printing inks, and the like, containing such improved drier compositions.

From the earliest times, paints contained substances which operated as drying agents. In the beginning of the art of paint making, the presence of such driers was in the main quite accidental. In order to impart coloration to the paint, it was, of course, necessary to employ pigments which were then available. Such pigments comprised the usual earth-colors, such as the umbers, the ochers, iron oxides, and the like. These earth colors were the source and precursors for the materials which operated as drying agents, since in the main such coloring agents were composed of metallic substances present either as oxides or other complex inorganic salts.

In admixture with the paint, which usually comprised a vegetable and/or animal oil, the coloring material underwent sufficient change to render it efficacious as a drying agent. It was soon recognized that the presence of the metallic elements in salt form promoted and accelerated the drying rate of the paint compositions, and it then became a deliberate action to add various metallic compounds, and at the beginning primarily lead oxide, to paints to accelerate the drying thereof.

Understanding and controlled use of drying agents for the oils normally employed in paint compositions did not begin to any degree until about the middle of the 19th century, when zinc oxide begain to replace white lead as a paint pigment. It was at times noticed that such paints containing zinc oxide pigments did not dry so well as the white lead paints. This brought about the discovery that the "cooking" of metallic oxides with oils produced oil-soluble metallic compounds capable of accelerating the drying rate of the oil films. Among the types of metallo-organic compounds which have been employed in the last 100 years as driers are the resinates, linoleates, etc., and, finally, the naphthenates. Except for some very recent developments in this field, to be discussed below, the technology of paint driers has remained practically static for hundreds of years. From the earliest recognition of the fact that, to obtain increased drying rate of oil film, it was necessary to incorporate into the oil a polyvalent metallic compound, the only significant improvements in this field have been directed to obtaining more uniformity and better solubility of the same but old metals, and this primarily by combining them with new and/or different organic acids.

Within the last decade, however, a new approach to the problem of drying agents for drying and semi-drying oil-containing composition has led to the discovery of two compounds exhibiting an accelerating effect upon the drying of the oils, either in the presence or absence of the heretofore employed naphthenates, oleates, and the like, of the polyvalent metals such as lead, cobalt, manganese, and the like. These compounds are o-phenanthroline and alpha-alpha'-di-pyridyl. It is significant, however, to note the following statement by Professor H. F. Payne in his book, "Organic Coating Technology," Volume 1, published by John Wiley & Sons, 1954, to the effect that, "This interesting material (o-phenanthroline) appears to be almost unique in its action, since only one other compound (alpha-alpha'-di-pyridyl) has been found to act similarly among 400 compounds which are related to it constitutionally."

It was, therefore, surprising and highly unexpected when I discovered a complete class of compounds possessed of the property of materially increasing or accelerating the rate of drying of drying- or semi-drying-oil-containing compositions.

While it has heretofore been, of course, possible to increase and accelerate the drying rate of such oleaginous compositions by the simple expedient of increasing the concentration of the metallic salts normally employed for such purpose, it is not, however, feasible to do this under most circumstances, due to the fact that such higher concentrations of metallic salts have a deleterious effect upon the resultant film, resulting in many cases in brittleness and poor durability upon exposure to light, heat, high humidity, chemicals, and the like. Therefore, the problem was not, and cannot be, solved by merely loading the oil compositions with such metallic driers.

The organic compounds, which may be employed in conjunction with the previously used metallic driers, permit of an increased rate of drying without the deficiencies accruing to the use of an increased amount of the metallic drying agents, and, furthermore, if it is desired, the metallic drying agents may be omitted entirely and satisfactory drying of the oleaginous films, usually present in paints, varnishes and the like, may be effected with the class of compounds designated as "accelerators," hereafter to be described.

It is, therefore, an object of this invention to provide drying- and semi-drying-oil-containing compositions having an increased rate of drying.

It is another object of this invention to provide new and useful drier compositions which may be employed to effect an increased rate of drying when used in conjunction with drying- or semi-drying-oil-containing compositions.

It is a further object of this invention to provide drying- and semi-drying-oil-containing compositions having an increased rate of drying in the absence of the conventional metallic driers. Other objects of this invention will appear hereafter as the description proceeds.

The above-described, and other objects, are accomplished in accordance with this invention by incorporating into drying- or semi-drying-oil-containing compositions an accelerator compound, or mixtures of such compounds, having the following structural formulas:

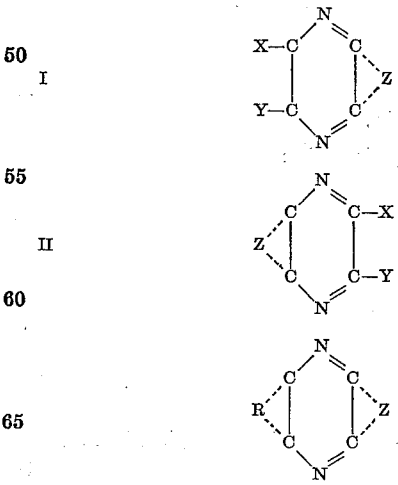

wherein X and Y may be hydrogen or organic groupings of aliphatic or aromatic series and R and Z represent the atomic groupings necessary to form a fused ring on the diazine nucleus. Additionally, the fused cyclic substituent must be one of the members of the group consisting of carbocyclic-aromatic and heterocyclic radicals.

Among the aliphatic and aromatic radicals which may be substituted for the substituents X and Y are the following:

ALIPHATIC

Alkyl, such as methyl, ethyl, n-propyl, isopropyl, n-butyl, iso-butyl, and the like Alkoxy, such as methoxy, ethoxy, n-propoxy, isopropoxy, n-butoxy, and the like Hydroxyalkyl, such as hydroxyethyl, hydroxy-n-propyl, hydroxy-n-butyl, and the like Haloalkyl, e.g., chloromethyl, bromomethyl, chloroethyl, and the like Halogen, such as chlorine, bromine, and the like Hydroxy, nitro, carboxy, carbalkoxy, e.g., $COOCH_3$, $COOC_2H_5$, and the like Acyl, e.g., $CH_3CO-$, $CH_3CH_2CO-$, and the like Acylamine, e.g., acetamido

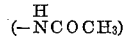

Dialkyl amino such as dimethylamino, diethylamino, and the like

AROMATIC (A) Of the benzene series, such as phenyl, tolyl, xylyl, benzyl, and the like, naphthyl-, alkyl-substituted naphthyl, and the like, benzyl, anthryl, phenanthryl, acenaphthenyl Substituted aryls:

Haloaryls, e.g. chlorophenyl, dichlorophenyl, bromophenyl, α-chloronaphthyl, β-chloronaphthyl, dichloronaphthyls, dibromonaphthyls, α-bromonaphthyl, β-bromonaphthyl, chlorobenzyls, bromobenzyls, chloroanthryls, bromoanthryls, and the like.

Nitro aryls, e.g., nitrophenyl, α- and β-nitronaphthyls, nitrotolyls, nitrobenzyls, nitroanthryls, and the like Oxyaryls, e.g.:

Phenoxy,
Halophenoxy (chlorophenoxy, bromophenoxy, etc.),
Toloxy,
Naphthoxy, and the like.

Arylsulfonyls, e.g.

Phenylsulfonyl,
Naphthylsulfonic, and the like.

Arylsulfonamides, e.g.

Phenylsulfonamido
p-Tolylsulfonamido,
b-Nitrophenylsulfonamido, and the like.

Acyl, e.g.

Benzoyl,
Toluyl,
Naphthoyls, and the like.

(B) Of the heterocyclic series:

Furyl,
Tetrahydrofuryl,
Benzofuryl,
Thienyl,
Thionaphthyl,
Pyrryl,
Pyrollidyl,
2-pyrollidonyl,
Indolyl,
Carbazolyl,
Benzocarbazolyls (e.g. 7-benzo[c]carbazolyl, 11-benzo[a]carbazolyl),
Oxazolyl,
Thiazolyl,
Isoxazolyl,
Isothiazolyl,
Pyrazolyl,
Imidazolyl,
Triazolyls,
Benzoxazolyl,
Benzthiazolyl,
Benzimidazolyl,
Benztriazolyls,
Oxadiazolyls,
Thiadiazolyls,
Pyridyl,
Pyrimidyl,
Quinolyl,
Isoquinolyl,
Acridinyl,
Phenathradinyls,
Benzoquinolyls,
Phenanthrolyls,
Dihydropyranyl,
Alkylthiapyranyls,
Xanthyl,
Pyronyls,
Xanthonyls,
Benzopyranyl,
Diazinyl (e.g. quinoxalinyl, quinazolinyl, phthalazinyl, phenazinyl, naphthophenazinyl, anthrazinyl, etc.),
Oxazinyls (e.g. phenoxazinyl, phenanthroxazinyl, naphthophenoxyazinyl, etc.),
Dibenzoparathiazinyl,
Dinaphthoparathiazinyl, and the various alkyl, alkoxy, halo, nitro, carboxy, carbalkoxy, acyl and acylamino derivatives of the aforementioned heterocyclic radicals.

Among the fused nuclei which result from the substitution of the selected atomic groupings R and Z in the above formulae are the following carbocyclic-aromatic ring structures:

Benzene
Naphthalene
Anthracene
Acenaphthene
Chrysene
Perylene
Pyrene
Phenanthrane and the like, and substituted derivatives thereof, such as:

The alkylated derivatives e.g. toluene,
The xylenes (o-, m- and p-),
Ethyl benzene,
Cumene,
Isocumene,
Mesitylene,
α- and β-naphthalene,
α- and β-ethyl naphthalene,
α-n-Propylnaphthalene,
1-methyl phenanthrene,
3-methyl phenanthrene,
Retene,
α-Methyl anthracene,
1,6-dimethylanthracene, and the like.

Alkoxy derivatives, e.g.

Anisole,
Phenetole,
p-Diethoxybenzene,
p-Dimethoxybenzene,
Veratrol,
Resorcinol dimethyl ether,
1-methoxy phenanthrene,
3,4-dimethoxy phenanthrene,
β-Naphthol-methyl ether,
β-Naphthol-ethyl ether, Hydroxyalkyl derivatives:

Hydroxyethylbenzene,
Hydroxypropylbenzene,
Methyl phenethyl alcohol,

Dimethylphenethyl alcohol,
Naphthalenethanol,

Halogen derivatives, e.g.

Chlorobenzene,
Bromobenzene,
1,2-dichlorobenzene,
1,3-dichlorobenzene,
1,3,5-trichlorobenzene,
1,2-dibromobenzene,
o-Chlorotoluene,
m-Chlorotoluene,
m-Bromotoluene,
Bromo-o-xylene,
Bromomesitylene,
α- and β-chloronaphthalene,
Dichloronaphthalene,
4-bromoacenaphthene, and the like.

Nitro derivatives, e.g.

Nitrobenzene,
o-Nitrotoluene,
p-Nitrotoluene,
4-nitro-o-xylene,
Nitromesitylene,
α- and β-nitronaphthalene,
4-nitroacenaphthalene,
3-nitrophenanthrene,
9-nitrophenanthrene, and the like.

Carboxy and carbalkoxy derivatives, e.g.

Benzoic acid,
The toluic acids,
The xylic acids,
Phthalic acids,
α- and β-naphthoic acid,
2,3-phenanthrene carboxylic acid,
Methyl benzoate,
Ethyl benzoate,
n-Propyl benzoate,
o-, m-, and p-toluic methyl esters,
1-naphthoic acid,
Methyl and ethyl esters, and the like.

Acyl derivatives, e.g.

Acetophenone,
Propiophenone,
Butyrophenone,
Lauroyl-benzene,
Palmitoyl benzene,
p-Acetyl toluene,
Acetyl-o-xylol,
1-acetyl,2-benzoyl benzene,
Acetonaphthone,
Benzoyl naphthalene,
Acetylacenaphthene, and the like.

Acylamino derivatives:

Acetanilide,
Methyl acetanilide,
o-, m-, and p-acetotoluide,
Acetoxylides,
Acetonaphthalide,
1,5-bis(propionylamino)naphthalene,
1,5-bis(lauroylamino)naphthalene, and the like.

Sulfonamide derivatives, e.g.

Benzene sulfonamide,
o- and p-toluenesulfonamide,
1-, and 2-naphthalene sulfonamide,
3,8-acenaphthalene disulfonamide, and the like.

The heterocyclic structures which result from the substitution of selected atomic groupings R and Z on the diazine nucleus include the heterocyclic radicals described above as suitable for X and Y.

Compounds illustrative of the formulae given above include the following:

Quinoxaline,
2-methyl quinoxaline,
2,3-dimethyl quinoxaline,
2-ethyl, 3-methyl quinoxaline,
2-methyl-3-propyl quinoxaline,
2,3-diethyl quinoxaline,
2-isopropyl quinoxaline,
2-phenyl quinoxaline,
2,3-diphenyl quinoxaline,
2,3-dibenzyl quinoxaline,
2-acetamido quinoxaline,

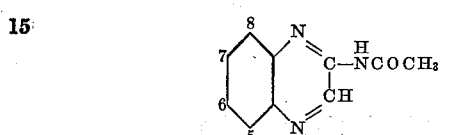

5-acetamide-7-methoxy quinoxaline,
2-acetyl-3-methyl quinoxaline,
2-acetyl-3-phenyl quinoxaline,
2,3-bis(bromomethyl)quinoxaline,

2,3-bis(3-nitro-p-tolyl)quinoxaline,

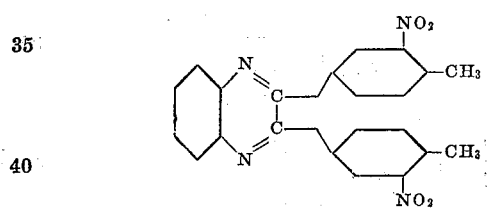

2-chloroquinoxaline,
2,3-dichloroquinoxaline,
2-bromoquinoxaline,
2-chloro-3-methoxyquinoxaline,
2,3-diethoxy quinoxaline,
2,3-dimethoxy quinoxaline,
2,3-dimethyl-6-acetyl quinoxaline

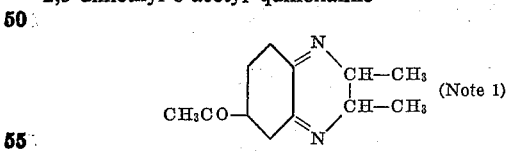

(Note 1).—The position of the double bonds in the diazine ring in the quinoxaline compounds may be as shown here or as shown in the above three structures; probably both exist in equilibrium.

2-hydroxy quinoxaline,
2,3-dihydroxy quinoxaline,
Toluquinoxaline

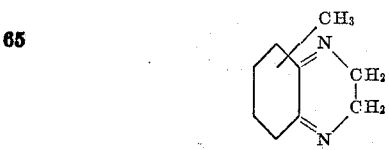

2-methyl quinoxaline,
2,3-dimethyl quinoxaline,
2-methyl-3-hydroxy quinoxaline,
2-phenyl-3-hydroxy quinoxaline,
2,3-diphenoxy quinoxaline, 6-nitro-2,3-di-o-tolyl quinoxaline

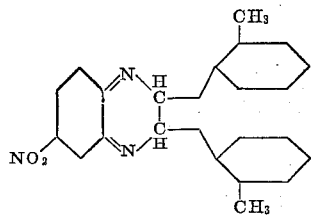

2,3-bis(p-chlorophenoxy)quinoxaline

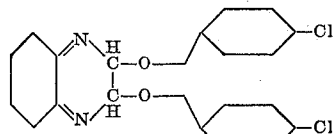

2,3-diphenyl-6-(phenylsulfonyl)quinoxaline

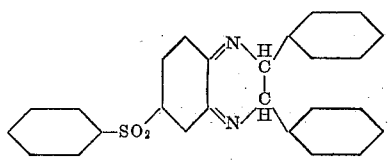

7-methoxy-5-p-tolylsulfamide quinoxaline

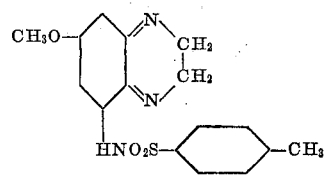

2-benzyl-3-(o-bromophenyl)quinoxaline

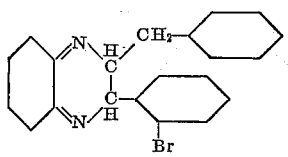

2,3-bis(p-nitrophenyl)quinoxaline

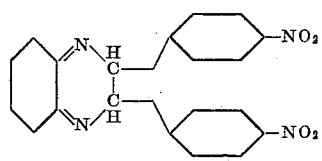

5-dimethylamino-8-methoxy quinoxaline

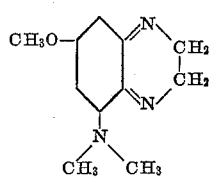

2-(m-nitrophenylsulfonamide)quinoxaline

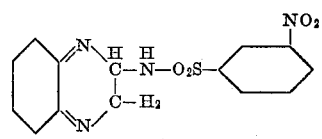

2,3-quinoxaline dicarboxylic dimethyl ester

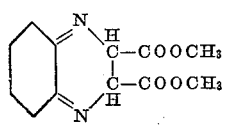

6-bromo-2,3-quinoxaline dicarboxylic dimethyl ester

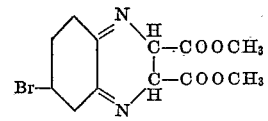

6-chloro-2,3-quinoxaline dicarboxylic dimethyl ester, Indoloquinoxaline

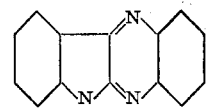

Dibenzoquinoxaline

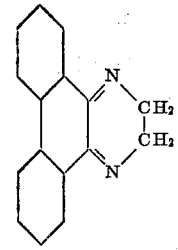

6-isopropyl-12-methyl dibenzoquinoxaline, Dibenzothienoquinoxaline

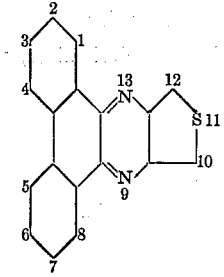

Phenanthrazine

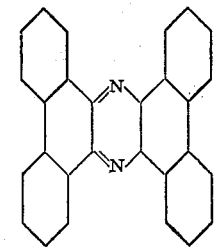

Phenanthrophenazine

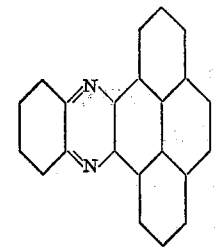

Dibenzo(a,c)phenazine

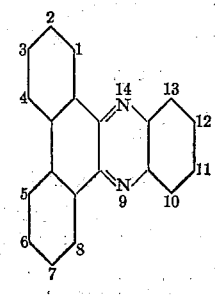

1-isopropyl-7-methyl dibenzo(a.c)phenazine,
2-phenyl dibenzo(a,c)phenazine,
3,5-dimethyl dibenzo(a,c)phenazine,
3-acetamido, 7-isopropyl,1-methyl dibenzo(a,c)phenazine,
Acenaphthoquinoxaline

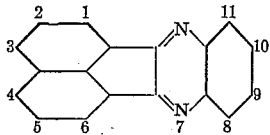

9-chloro-10-methyl acenaphthoquinoxaline,
1,5-dimethyl acenaphthoquinoxaline,
1,6-dimethyl acenaphthoquinoxaline,
Fluoflavine

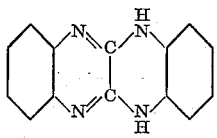

Benzophenazine (a)

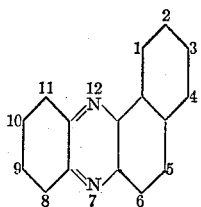

5-benzamido benzophenazine,
5-benzyl benzophenazine,
5-methyl benzophenazine,
6-methyl benzophenazine,
benzophenazine (b)

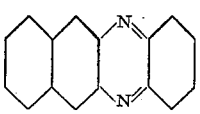

Dibenzophenazine (a,j)

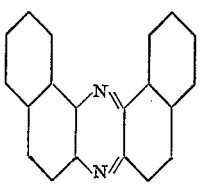

Naphthazine

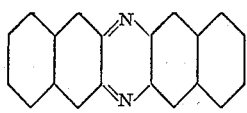

Phenazine

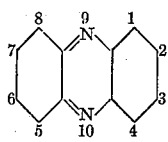

1,4-bis(p-nitrobenzyl)phenazine,
1-chlorophenazine,
1,4-dibenzylphenazine,
1-methoxyphenazine,
2-methoxyphenazine,
1-methylphenazine,
2-methylphenazine, Phenanthro[0',10',4,5]thieno[2,3.b]quinoxaline

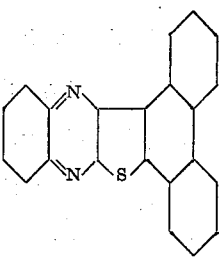

Naphthophenazine

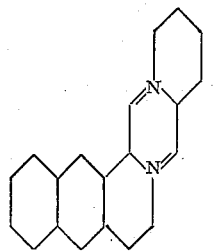

Benzofuro(2,3.b)quinoxaline

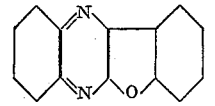

These compounds are well known in the art and may be prepared in the normal manner for the preparation of such diazines such as by the condensation of o-diamino compounds with o-diketo compounds. Thus, the compound quinoxaline, having the formula

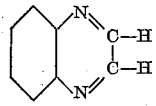

may be prepared from o-phenylenediamine and glyoxal. o-phenylenediamine condensed with phenanthraquinone results in the compound of the formula:

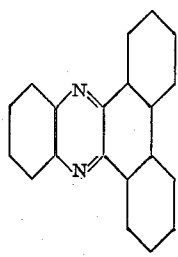

Dibenzo(a,c)phenazine

The amount of the above-described compounds which may be incorporated in the drying or semi-drying oil-containing compositions, may vary widely and is in general not critical. For best results, however, and from an economics point of view, such composition should contain from about 0.02 to about 2%, and preferably from about 0.04 to about 0.5% by weight of the aforementioned compounds based upon the drying or semi-drying oil content of the composition. If metallic driers are also employed in conjunction with these compounds, the amounts thereof are those usually employed in the coating and paint-making composition art. The ratio of the accelerator described above to the metallic drier in the composition may be varied similarly, but ratios of about 25:1 to 1:10 gives satisfactory results and, within this range, a ratio of about 10:1 to 1:2 is the most preferable.

As described above, any of the commonly heretofore employed metallic driers may be used in conjunction with the accelerators described above. Among such metallic driers are the fololwing:

Lead naphthenate, lead oleates, lead octoates, lead linoleates,
Cobalt naphthenate, cobalt oleates, cobalt octoates, cobalt linoleates,
Calcium naphthenate, calcium oleates, calcium octoates, calcium linoleates,
Manganese naphthenate, manganese oleates, manganese octoates, manganese linoleates.

The drier compositions containing the metallic driers and the accelerators may be prepared by merely admixing the ingredients or they may be dissolved in a suitable common solvent. The solvent may be a drying or semi-drying oil or a diluent such as xylene, toluene, benzene and the like.

As mentioned above, the drier composition may contain more than one accelerator and, similarly, more than one metallic drier.

The drying or semi-drying oil-containing compositions are those which are normally used in preparing bases for varnishes, enamels, printing inks, paints and the like. Such compositions may be composed exclusively of drying or semi-drying oils, such as linseed oil, soya bean oil, tung oil, oiticica oil, perilla oil, dehydrated castor oil, either in the raw, blown, or heat-bodied form. Alternatively, the composition may be one which is modified with one of the aforementioned drying or semi-drying oils, and such film-forming materials which may be so modified include the following:

(1) The alkyds, derived from polyhydric alcohols, such as glycerol, ethyleneglycol, pentaerythritol, and the like, and polybasic acids, such as maleic, phthalic, and the like,
(2) Rosin-modified maleic-alkyds,
(3) Coumarone-indene resins,
(4) Phenolics, unmodified and rosin-modified,
(5) Ester gums,
(6) Modified rosins such as hydrogenated, polymerized, limed, and the like,
(7) Natural resins, such as the dammars, copals, and various other miscellaneous natural resins well known in the art.

The compositions of the present invention may also include, if desired, the usual pigments, fillers, extenders, resins, plasticizers, thinners, and other modifiers commonly employed in the preparation of enamels, paints, printing inks, and the like.

The following specific examples will serve to illustrate the present invention without being deemed limitative thereof.

*Example 1*

To 7.15 g. of an oil modified alkyd-(70% solids) having an acid number of 5-7 (containing 25% phthalic anhydride, 60% soya oil and 15% glycerol) dispersed in 3.80 cc. of xylene there are added 0.525 cc. of a 0.06% (calculated as manganese metal) xylene solution of a manganese naphthenate drier and 0.40 cc. of a 1% solution in dioxane of "drier accelerator" dibenzo (a,c) phenazine. This composition is allowed to age for 24 hours before use. Four films of this composition are cast on a glass plate using a 3-mil applicator. Two of these films (1a and 1b) are air dried and the resulting film characteristics noted after each hour for seven hours and then after 24 hours. The results are set forth in Table I. The other two cast films (1a' and 1b') are subjected to baking for one hour at 250° F. The baked films are nontacky and quite hard.

*Example 2*

The same composition as described in Example 1 is employed except that the drier accelerator is omitted. Two films are cast and processed as in Example 1. The baked film (2b) is considerably softer than the baked samples of Example 1, and the air dried film (2a) has considerable tack after 24 hours as shown in Table I.

*Example 3*

The procedure of Example 1 is repeated except that one-half the amount of drier accelerator is used and three samples each of air dried (3a, b and c) and baked films (3a', b', and c') are prepared. The baked films are comparable to the ones obtained in Example 1. The air dried films exhibit slight tack.

*Example 4*

The procedure of Example 1 is repeated using one-quarter the amount of drier accelerator used therein. The baked films (4a' and 4b') again are comparable to those produced in Example 1 and the air dried films (4a and 4b) exhibit slight tack. The results in Examples 3 and 4 are set forth in Table I.

*Example 5*

The procedure of Example 1 is repeated except that twice the amount of manganese drier is used, the characteristics of the air dried films (5a and 5b) and of the baked films (5a' and 5b') are set forth in Table I.

*Example 6*

The procedure of Example 3 is repeated except that the amount of manganese drier is doubled. The characteristics of the air dried films (6a, b, and c) and the baked films (6a', b', and c') are given in Table I.

*Example 7*

The procedure of Example 4 is repeated using, however, double the amount of manganese drier. The characteristics of the air dried films (7a and 7b) and the baked films (7a' and 7b') are given in Table II.

*Example 8*

A composition of the following ingredients is prepared:

14.30 g. alkyd resin of Example 1
7.60 cc. xylene
0.40 cc. 1% solution of acenaphthoquinoxaline in dioxane The composition is divided into two equal portions and to one of said portions there is added 0.525 cc. of 0.06% (calculated as manganese metal) xylene solution of a manganese naphthenate drier; to the second of said portions there is added 1.05 cc. of the aforementioned manganese drier solution. Films from each of the two resin compositions are air dried (8a and 8b) and baked (8a' and 8b') as described in the preceding examples. The results are given in Table II.

*Example 9*

This example demonstrates the drying effectiveness of the diazine compounds in the absence of any metallic driers:

A composition containing 14.30 g. alkyd resin of Example 1, and 7.60 cc. xylene is divided into two equal portions. To one is added the drier accelerator and in the same amount as in Example 3, and to the other the same drier accelerator and amount thereof as in Example 8. Two films are cast from the first (9a and 9a') and two from the second (9b and 9b') portions. Films 9a and 9b are air dried and 9a' and 9b' baked in the manner previously described. The results are given in Table II. It will be noted that the air dried films are further advanced to the dry state than the film described in Example 2 (wherein only manganese drier is present), and the baked films are comparable to that set forth in Example 2, clearly indicating, at the least, that the diazines are as effective by themselves, in the concentrations used, as the manganese drier in both the air dried and baked systems.

In the following Tables I and II the film characteristics of the air dried films are identifiable as follows:

(a) Not dry  (d) Dry—slight tack
(b) Drying—very tacky  (e) Dry—very slight tack
(c) Drying—tacky  (f) Dry—no tack The baked films are similarly identified and in addition the hardness characteristics are evaluated as follows:

(1) Soft film of Example 2b
(2) Hard film of Example 1a' and 1b'
(3) Harder than film of Examples 1a' and 1b'
(4) Slightly harder than 3

TABLE I

| Ex. | Percent based on oil content of vehicle | | Film characteristics after— | | | | | | | | |
|---|---|---|---|---|---|---|---|---|---|---|---|
| | Accelerator | Mn. metal drier | Air drying, hours | | | | | | | | Bake 1 hr. at 250° F. |
| | | | 1 | 2 | 3 | 4 | 5 | 6 | 7 | 24 | |
| 1a | 0.133 | 0.010 | a | a | a | a | b | b | c | d | |
| 1b | 0.133 | 0.010 | a | a | a | a | b | b | c | e | |
| 1a' | 0.133 | 0.010 | | | | | | | | | 2F |
| 1b' | 0.133 | 0.010 | | | | | | | | | 2F |
| 2a | None | 0.010 | a | a | a | a | a | a | a | b | |
| 2b | None | 0.010 | | | | | | | | | 1d |
| 3a | 0.067 | 0.010 | a | a | a | a | a | b | b | d | |
| 3b | 0.067 | 0.010 | a | a | a | a | b | b | c | e | |
| 3c | 0.067 | 0.010 | a | a | a | a | b | b | c | e | |
| 3a' | 0.067 | 0.010 | | | | | | | | | 2F |
| 3b' | 0.067 | 0.010 | | | | | | | | | 2F |
| 3c' | 0.067 | 0.010 | | | | | | | | | 2F |
| 4a | 0.038 | 0.010 | a | a | a | a | a | b | b | d | |
| 4b | 0.038 | 0.010 | a | a | a | a | b | b | c | d | |
| 4a' | 0.038 | 0.010 | | | | | | | | | 2F |
| 4b' | 0.038 | 0.010 | | | | | | | | | 2F |
| 5a | 0.133 | 0.020 | a | a | b | b | c | c | c | e | |
| 5b | 0.133 | 0.020 | a | a | b | b | d | d | d | e | |
| 5a' | 0.133 | 0.020 | | | | | | | | | 3F |
| 5b' | 0.133 | 0.020 | | | | | | | | | 3F |
| 6a | 0.067 | 0.020 | a | a | a | b | b | b | c | d | |
| 6b | 0.067 | 0.020 | a | a | a | b | b | c | c | d | |
| 6c | 0.067 | 0.020 | a | a | a | b | b | b | c | d | |
| 6a' | 0.027 | 0.020 | | | | | | | | | 3F |
| 6b' | 0.067 | 0.020 | | | | | | | | | 3F |
| 6c' | 0.067 | 0.020 | | | | | | | | | 2F |

TABLE II

| Ex. | Percent based on oil content of vehicle | | Film characteristics after— | | | | | | | | |
|---|---|---|---|---|---|---|---|---|---|---|---|
| | Accelerator | Mn. metal drier | Air drying, hours | | | | | | | | Bake 1 hr. at 250° F. |
| | | | 1 | 2 | 3 | 4 | 5 | 6 | 7 | 24 | |
| 7a | 0.038 | 0.020 | a | a | a | a | b | b | b | d | |
| 7b | 0.038 | 0.020 | a | a | a | a | b | b | c | d | |
| 7a' | 0.038 | 0.020 | | | | | | | | | 3F |
| 7b' | 0.038 | 0.020 | | | | | | | | | 4F |
| 8a | 0.067 | 0.010 | a | a | a | a | b | c | d | e | |
| 8b | 0.067 | 0.020 | a | a | a | b | b | c | d | F | |
| 8a' | 0.067 | 0.010 | | | | | | | | | 3F |
| 8b' | 0.067 | 0.020 | | | | | | | | | 4F |
| 9a | 0.067 | None | a | a | a | a | a | a | a | d | |
| 9b | 0.067 | None | a | a | a | a | a | a | a | c | |
| 9a' | 0.067 | None | | | | | | | | | 1d |
| 9b' | 0.067 | None | | | | | | | | | 1d |
| 10a | 0.167 | 0.010 | a | a | a | a | a | a | b | c | |
| 10b | 0.167 | 0.010 | | | | | | | | | 2e |
| 11a | 0.167 | 0.010 | a | a | a | a | a | a | b | c | |
| 11b | 0.167 | 0.010 | | | | | | | | | 2e |
| 12a | 0.067 | 0.008 | a | a | b | b | c | d | e | F | |
| 12b | 0.067 | 0.008 | a | a | b | b | c | d | e | F | |
| 12a' | 0.067 | 0.008 | | | | | | | | | 3F |
| 12b' | 0.067 | 0.008 | | | | | | | | | 3F |
| 12c | 0.134 | 0.008 | a | a | b | c | d | e | F | F | |
| 12c' | 0.134 | 0.008 | | | | | | | | | 4F |
| 12d | 0.134 | 0.016 | a | b | c | d | e | F | F | F | |
| 12d' | 0.134 | 0.016 | | | | | | | | | 4F |

Example 10

Example 1 is repeated except that in place of the dibenzo (a,c) phenazine solution in Example 1, 0.50 cc. of a 1% solution of dioxane of indoloquinoxaline is employed. Films (10a and b) are cast as in Example 1 and the characteristics given in Table II.

Example 11

Example 10 is repeated using 0.50 cc. of a 1% solution of 2,3-diphenyl quinoxaline as the drier accelerator. The results are tabulated in Table II (11a and 11b).

Example 12

To 71.50 grams of the alkyd resin described in Example 1 (70% solids content) there are added 0.02 g. of the drier accelerator having the formula:

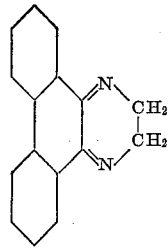

and 0.042 g. of a 6% manganese naphthenate solution and 28.4 g. of mineral spirits. This composition is divided into four equal parts, each containing 0.067% of the drier accelerator and 0.0083% manganese drier (as the metal) based on the oil content. One of these aliquot portions is tested in the manner described in Example 1, i.e. two air dried (12a and 12b) and two baked samples (12a' and 12b') are prepared and tested. The results are given in Table II. To another aliquot portion there is added sufficient drier accelerator to bring the concentration to 0.134% based on the oil content of the alkyd resin. About 0.005 g. is required. One air dried film (12c) and one baked film (12c') are prepared and tested as above. See Table II for results. To the third aliquot portion there are added 0.005 g. of the drier accelerator and 0.010 g. of the 6% manganese naphthenate drier, giving an accelerator concentration of 0.134% and a manganese content of 0.016% based on the oil content of the alkyd resin. One air-dried (12d) and one baked film (12d') are prepared and tested as above. See results in Table II.

Example 13

To 83.5 g. of an alkyd resin (60% solids in petroleum spirits) having an acid number of 4–6 and composed essentially of about 30% phthalic anhydride, 50% soya oil acids and 20% glycerol there are added 0.01 g. of dibenzo (a,c) phenazine drier accelerator, 0.042 g. of a 6% manganese naphthenate drier and 16.28 g. of xylol. This composition is divided into four equal parts. Using one of said parts, 5 mil wet films are drawn on glass plates, one is air dried (13a) and one is baked (13a') in the manner previously described. The results appear in Table III. To a second of the said aliquot portions there is added an additional 0.0025 g. of drier accelerator. An air dried and baked film sample (13b and 13b') are prepared and evaluated as above. The results are given in Table III. To the third of the aliquot portions there is added an additional 0.0094 g. of drier accelerator and from this composition an air dried film (13c) and a baked film (13c') are cast and tested and, again, the results thereof are set forth in Table III.

Example 14

A composition similar to that of Example 13 is prepared except that 0.02 g. of acenaphthoquinoxaline is employed as the drier accelerator. An air dried film (14a) and a baked film (14b) are cast and the results evaluated in Table III.

Example 15

A varnish is prepared from 200 parts of a rosin-modified phenol resin (M.P. 142–149), 150 parts tung oil and 50 parts Q-bodied linseed oil in the usual manner. Mineral spirits is added to give a solids content of 50%. To 120 g. of this varnish (60 g. solids) there are added 0.02 g. of dibenzo (a,c) phenazine and 0.065 g. of a 6% manganese naphthenate drier. Samples of air dried films (15a and 15b) are cast and evaluated as above. Samples of baker films (15a' and 15b') are also tested as above. The results appear in Table III.

*Example 16*

To 100 grams of each of two bodied linseed oils (Q- and Z- bodied) is added 0.20 g. of dibenzo (a,c) phenazine. The oils are heated to about 110° C. to effect solution of the additive. Films are cast from the two oil samples. Those from the modified oils (16a and 16b) after 7 hours are found to be much less tacky than those cast from unmodified oils (16a' and 16b'). See Table III for results.

*Example 17*

0.30 gram of acenaphthoquinoxaline are added to 100 grams of dehydrated castor oil dissolved in 100 g. of xylol. The mixture is heated with stirring at about 110° C. Films of 5 mil wet thickness are cast (17a). Such films set-up dry to the touch much more rapidly than films from the unmodified oil (17b). The results are given in Table III.

*Examples 18–20*

The procedure of Example 1 is repeated except that the "drier accelerator" employed is as follows:
  Example 18.—0.005 g. 7-methoxy-5-p-tolysulfamide quinoxaline.
  Example 19.—0.005 g. benzofuro (2,3b) quinoxaline.
  Example 20.—0.005 g. 7-chloropyrido (3,4) pyrazine.
Air-dried and baked film samples are prepared as in Example 1. The results are comparable to those of that example.

*Examples 21–26*

To separate samples of Q-bodied linseed oil there is added 0.3% of the following drier accelerators:
  Example 21.—7-methoxy-5-p-tolysulfamide quinoxaline.
  Example 22.—Benzofuro (2,3b) quinoxaline.
  Example 23.—7-chloropyrido (3,4) pyrazine.
  Example 24.—2,3-quinoxaline dicarboxylic dimethyl ester.
  Example 25.—2,3 dimethyl-6-acetyl quinoxaline.
  Example 26.—1-methoxy phenazine.
Films cast from these oil samples exhibited much less tack after 8 hours air drying than films from the unmodified oils.

In the following Table III the film characteristics are identifiable similarly as in Tables I and II.

Variations and modifications which will be obvious and apparent to those skilled in the art can be made in the hereinbefore described procedures and compositions without departing from the scope or spirit of the invention.

TABLE III

| Ex. | Percent based on oil content of vehicle | | Film characteristics after— | | | | | | | | |
| --- | --- | --- | --- | --- | --- | --- | --- | --- | --- | --- | --- |
|  | Accelerator | Mn. metal drier | Air drying, hours | | | | | | | | Bake 1 hr. at 250° F. |
|  |  |  | 1 | 2 | 3 | 4 | 5 | 6 | 7 | 24 |  |
| 13a | 0.040 | 0.010 | a | a | b | c | c | d | d | F |  |
| 13a' | 0.040 | 0.010 |  |  |  |  |  |  |  |  | 3F |
| 13b | 0.080 | 0.010 | a | a | b | c | d | d | e | F |  |
| 13b' | 0.080 | 0.010 |  |  |  |  |  |  |  |  | 3F |
| 13c | 0.160 | 0.010 | a | b | c | d | d | e | F | F |  |
| 13c' | 0.160 | 0.010 |  |  |  |  |  |  |  |  | 4F |
| 14a | 0.080 | 0.010 | a | a | c | d | d | e | F | F |  |
| 14b | 0.080 | 0.010 |  |  |  |  |  |  |  |  | 4F |
| 15a | 0.050 | 0.010 | a | a | b | c | d | e | F | F |  |
| 15b | 0.050 | 0.010 | a | a | b | b | d | e | e | F |  |
| 15a' | 0.050 | 0.010 |  |  |  |  |  |  |  |  | 4F |
| 15b' | 0.050 | 0.010 |  |  |  |  |  |  |  |  | 4F |
| 16a | 0.20 | None | a | a | a | a | a | b | b | c |  |
| 16b | 0.20 | None | a | a | a | a | a | b | b | c |  |
| 16a' | None | None | a | a | a | a | a | a | a | b |  |
| 16b' | None | None | a | a | a | a | a | a | a | b |  |
| 17a | 0.30 | None | a | a | a | a | a | b | b | c |  |
| 17b | None | None | a | a | a | a | a | a | a | b |  |

I claim:
1. A coating composition comprising a film-forming material containing a component selected from the group consisting of drying- and semi-drying oils and mixtures thereof and a diazine compound present in substantial amounts up to about 2% based on the weight of oil and selected from the group consisting of those having the formulae:

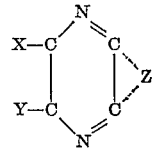

I

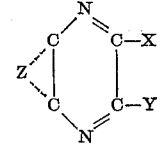

II and

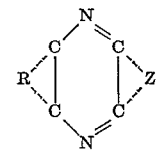

III wherein X and Y are selected from the group consisting of hydrogen halogen, hydroxyl, nitro, and monovalent organic radicals and R and Z represent the atomic groupings necessary to form a fused ring on the diazine nucleus, said fused ring being selected from the group consisting of aromatic carbocyclic and heterocyclic ring structures, and mixtures thereof.

2. A composition as defined in claim 1, wherein said film-forming material is an oil-modified alkyd resin, said oil being selected from the group consisting of drying and semi-drying oils.

3. A composition as defined in claim 1, wherein said diazine compound contains dibenzo(a,c)phenazine.

4. A composition as defined in claim 1, wherein said diazine compound contains acenaphthoquinoxaline.

5. A composition as defined in claim 1, wherein said diazine compound contains 2,3-diphenylquinoxaline.

6. A composition as defined in claim 1, wherein said diazine compound contains dibenzoquinoxaline.

7. A composition as defined in claim 2, wherein the diazine compound comprises dibenzo(a,c)phenazine.

8. A coating composition comprising a film-forming base selected from the group consisting of drying- and semi-drying oils and mixtures thereof, and as a drier therefor a mixture comprising dibenzo-(a,c)phenazine and a metallic drier.

9. A composition as defined in claim 8, wherein said metallic drier is an organo-manganese drier.

10. A coating composition comprising an oil-modified alkyd resin, dibenzo(a,c) phenazine and a metallic drier, said oil being selected from the group consisting of drying and semi-drying oils.

11. A coating composition comprising a film-forming material containing a component selected from the group consisting of drying- and semi-drying oils and mixtures thereof and containing a drier composition comprising a diazine compound present in substantial amounts up to about 2% based on the weight of oil and selected from the group consisting of those having the formulae:

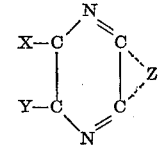

I

II 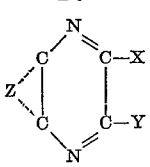

and

III 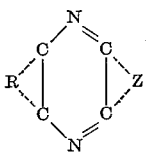

wherein X and Y are selected from the group consisting of hydrogen, halogen, hydroxyl, nitro, and monovalent organic radicals and R and Z represent the atomic groupings necessary to form a fused ring on the diazine nucleus, said fused ring being selected from the group consisting of aromatic carbocyclic and heterocyclic ring structures, and mixtures thereof and an organo-metallic drier.

12. A composition as defined in claim 11, wherein the film-forming material is a soya oil modified alkyd resin.

13. A composition as defined in claim 12, wherein said alkyd resin is a glyceryl phthalate resin.

14. A composition as defined in claim 11, wherein the organo-metallic drier is a manganese drier.

15. A composition as defined in claim 1 wherein the diazine compound is present in amounts of from about 0.02% to about 2% by weight thereof based on the oil content of the composition.

16. A composition as defined in claim 15 wherein the diazine compound is present in amounts of from about 0.04% to about 0.5%.

17. A coating composition comprising a semi-drying oil film-forming material and from about 0.04% to about 0.5% by weight of dibenzo(a,c)phenazine based on the oil content of the composition.

18. A composition as defined in claim 17 wherein the film-forming material is a soya-oil modified glyceryl phthalate resin.

19. A coating composition comprising a soya-oil modified glyceryl phthalate resin and from about 0.04% to about 0.13% by weight of dibenzo(a,c)phenazine based on the oil content of the composition.

20. A coating composition comprising a semi-drying-oil modified alkyd resin film-forming material and from about 0.04% to about 0.5% by weight of acenaphthoquinoxaline based on the oil content of the composition.

21. A coating composition comprising a drying-oil film-forming material and from about 0.04% to about 0.5% by weight of dibenzo(a,c)phenazine based on the oil content of the composition.

22. A composition as defined in claim 21 wherein the drying-oil is linseed-oil.

23. A composition as defined in claim 21 wherein the drying-oil is tung oil.

24. A composition as set forth in claim 21 wherein the drying-oil is dehydrated castor oil.

25. A composition as defined in claim 11 wherein the diazine compound is present in amounts of from about 0.02% to about 2% by weight thereof based on the oil content of the composition and the ratio of the said diazine compound to the organo metallic drier is from 25:1 to 1:10.

26. A composition as defined in claim 25 wherein the film-forming material is a soya-oil modified alkyd resin and the ratio of diazine compound to organo metallic drier is from 10:1 to 1:2.

27. A composition as defined in claim 25 wherein the film-forming material comprises a drying-oil substance.

28. A composition as defined in claim 27 wherein the drying-oil is linseed-oil.

29. A composition as defined in claim 27 wherein the drying-oil is tung oil.

30. A composition as defined in claim 27 wherein the drying-oil is dehydrated castor oil.

31. A composition as defined in claim 1 wherein said film-forming material includes an oil-soluble resin.

32. A composition as defined in claim 11 wherein said film-forming material includes an oil-soluble resin.

References Cited in the file of this patent

UNITED STATES PATENTS

| | | |
|---|---|---|
| 2,238,487 | Dickey et al. | Apr. 15, 1941 |
| 2,292,542 | Patterson | Aug. 11, 1942 |
| 2,306,440 | Hentrich et al. | Dec. 29, 1942 |

FOREIGN PATENTS

| | | |
|---|---|---|
| 720,946 | Germany | May 20, 1942 |

UNITED STATES PATENT OFFICE
CERTIFICATE OF CORRECTION

Patent No. 3,005,789                            October 24, 1961

Albert Bloom

It is hereby certified that error appears in the above numbered patent requiring correction and that the said Letters Patent should read as corrected below.

Column 3, line 51, for "b-Nitrophenylsulfonamido" read -- m-Nitrophenylsulfonamido --; column 10, line 1, for "[0´,10´,4,5]" read -- [9´,10´,4,5] --; column 15, line 2, for "baker" read -- baked --.

Signed and sealed this 3rd day of September 1963.

(SEAL)
Attest:

ERNEST W. SWIDER                            DAVID L. LADD
Attesting Officer                               Commissioner of Patents